United States Patent Office 3,491,124
Patented Jan. 20, 1970

3,491,124
STABILIZERS FOR HALOGEN-CONTAINING POLYOLEFINS
Richard B. Lund, Whippany, Hendrikus J. Oswald, Morristown, and Edith Turi, Livingston, N.J., assignors, by mesne assignments, to The Dow Chemical Company, Midland, Mich., a corporation of Delaware
No Drawing. Original application Feb. 27, 1964, Ser. No. 347,666, now Patent No. 3,312,657. Divided and this application Jan. 20, 1967, Ser. No. 635,930
Int. Cl. C07d *1/00;* C07c *43/20, 39/06*
U.S. Cl. 260—348  1 Claim

ABSTRACT OF THE DISCLOSURE

The present invention relates to novel compounds having a bisoxyaryl - 2,3,5,6 - tetrachloro - p-xylene nucleus and methods for their preparation. These compounds are useful as heat stabilizers for chlorinated polyethylene.

---

This is a division of application Ser. No. 347,666, filed Feb. 27, 1964, now Patent No. 3,312,657.

It is well known that halogen-containing polyolefins such as polyvinyl chloride, chlorinated polyethylene and chlorinated polypropylene are adversely affected when they are exposed to elevated temperatures either during fabrication or in use. The effect of such exposure manifests itself in a darkening of the color of the material; also a noticeable change in viscosity occurs which is demonstrated by the increased work required to fabricate such heated material by extrusion or in a blender-mixer such as a Banbury mixer. It is generally believed that this temperature exposure-caused change in viscosity is due to splitting hydrogen halide out of the polymer molecule coupled with increased crosslinking of the polymer molecules. The degradation of the physical properties is often also manifested by increased brittleness, loss of impact strength, deterioration of electrical insulating characteristics, etc. The degradation mechanism is believed to result in the crosslinking or gel formation of the originally substantially noncrosslinked-chain polymer.

Many additives have been proposed in the prior art for retarding the degradation process. Such additives allow fabrication and use of these heat sensitive plastics at elevated temperature without impairment in properties thereby extending their useful lives. Metal salts of organic acids, metal pherolates, organometallic compounds, esters of phosphorous acid and various inorganic salts have been so used. The disadvantage of additives of metallic and inorganic compositions is that they are generally incompatible with the polymers causing loss of transparency, discoloration and nonhomogeneous appearance.

Not all additives have the same effect on the same polymer. Nor is there any predictable consistency in the stabilizing effect when the prior art additives are used in various types of halogen-containing polyolefins. For instance, products which are valuable for use with polyvinyl chloride compositions may or may not be of value in certain chlorinated polyethylene compositions.

It is an object of this invention to provide heat stable compositions based upon chlorinated ethylene polymers. It is a further object to provide such compositions which are thermally stabilized with metal-free organic stabilizers.

According to our invention chlorinated ethylene polymers can be given improved thermal stability by the addition of a compound consisting essentially of the bisoxyaryl-2,3,5,6-tetrachloro-p-xylene nucleus. Representative examples of the stabilizers of the invention include α,α'-bis(3,5 - dimethyl - 4 - hydroxyphenyl)-2,3,5,6-tetrachloro-p-xylene:

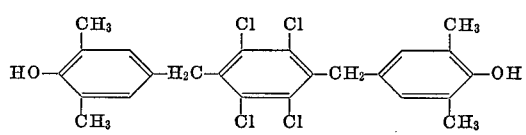

α,α' - bis(3,5 - dimethyl - 4-glycidyloxyphenyl)-2,3,5,6-tetrachloro-p-xylene:

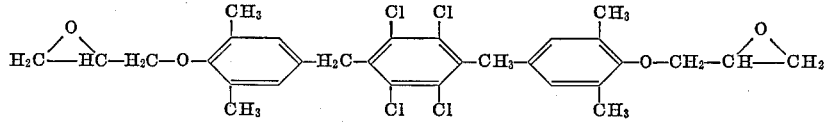

α,α' - bis(3,5 - dimethyl - 4-alloxyphenyl)-2,3,5,6-tetrachloro-p-xylene:

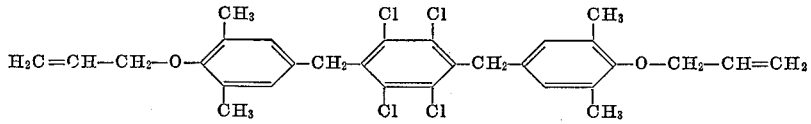

α,α' - bis(3,5 - dimethyl - 4-benzyloxyphenyl)-2,3,5,6-tetrachloro-p-xylene:

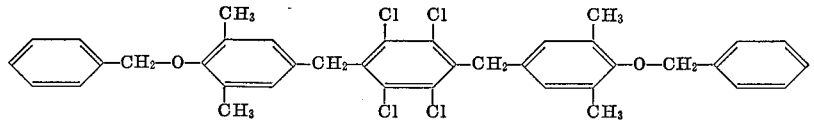

α,α' - bis(4 - hydroxynaphthyl) - 2,3,5,6-tetrachloro-p-xylene:

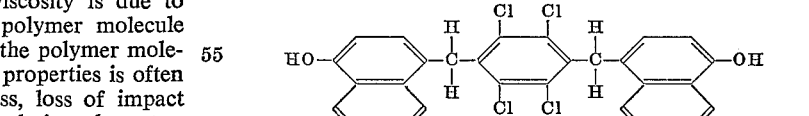

While the concentration of the stabilizer does not appear to be critical, the preferred range was found between 0.5 and 10 percent by weight of the polymer.

The tetrachloro-p-xylene derivatives can be prepared by condensation of α,α'-2,3,5,6-hexachloro-p-xylene with phenols or naphthols (which may or may not be substituted) according to the condensation processes disclosed generally in application for United States Letters Patent, Ser. No. 140,220, filed Sept. 25, 1961, now U.S. Patent No. 3,232,993.

The bisphenol resulting from such a condensation can be used as the heat-stabilizing agent of the invention, or it can be modified by substitution of the phenolic hydroxyl so as to incorporate additional side chains into the compound's structure. Thus the diglycidyl ether of the bisphenol can be made by treatment with epichlorohydrin, the allyl ether of the bisphenol can be made by treating the latter with allyl chloride and alkali, the naphthyl derivative can be made by reaction with alpha naphthol, and the benzyl derivative can be made by reaction with benzyl chloride.

These stabilizers practically inhibit crosslinking of chlorinated polyethylene chains at a temperature of 200° C. for a period of at least 60 minutes as well as prevent drastic discoloration of the polymer, in comparison with the effect observed in the case of several hundred other compositions of various structures which in our trials for finding stabilizers for chlorinted polyethylene had shown practically no stabilizing effect, and allowed or even increased crosslinking and did not inhibit discoloration.

The stabilizers can be employed with other common additives used in halogenated polyolefin formulations, such as stabilizers against the effects of radiation, fillers, pigments, and dyes. The stabilizer can be incorporated into the polymer formulation by any known blending technique.

The effectiveness of these stabilizers can be measured by determination of the extent of crosslinking which is occasioned in the polymer by exposure to elevated temperatures. This crosslinking can be measured by the amount of gel formation. The latter can be determined as the percentage of the polymer, originally entirely soluble in monochlorobenzene, which is no longer soluble after the heat treatment. Gel formation increases viscosity and slows the rate of extrusion of the polymer if extrusion is carried out at a constant pressure on the polymer.

A further measure of effectiveness of stabilization is the comparison of color of the unstabilized material with that of the stabilized material after both have been exposed to elevated temperature.

The chlorinated polyethylene stabilized by our invention can contain from about 20 to about 80% by weight chlorine. In a preferred embodiment, the chlorinated polyethylene is randomly chlorinated whereby it is essentially amorphous and has a low brittle point (glass transition temperature), such as about 0° C. or lower at 20 percent chlorine content and rising with chlorine content to over 185° C. at 80 percent chlorine content. Particularly suitable polyethylenes to be chlorinated for use in our invention are those produced as described in Example 6 of British Patent No. 858,674 of Jan. 11, 1961, to Allied Chemical Corporation. Such polyethylenes can be chlorinated with advantage for use in our invention by the process described in Example 3 of French Patent No. 1,316,044 of Dec. 17, 1962, to Allied Chemical Corporation.

The polymerization process of British Patent No. 858,674 results generally in a polymer of high molecular weight such as 500,000 to 5,000,000 average molecular weight, and of density of about 0.935 to 0.95 gm./cm.$^3$ at 25° C. The molecular weight of the polymer can be reduced by a thermal treatment, for instance in accordance with the process outlined at page 12, lines 73–77 of the above-identified British Patent No. 858,674. The molecular weight of the resulting polyethylenes will be in the range of about 20,000 to 300,000, and the density will be about 0.94-0.985 gm./cm.$^3$ at 25° C.

The foregoing molecular weights are calculated from the intrinsic viscosity of a solution of the polymer in decalin, according to the method of P.S. Francis et al. (Journal of Polymer Science, vol. 31, pp. 453–466), i.e. by using the following formula:

$$[\eta] = 6.77 \times 10^{-4} \times M^{0.67}$$

where $[\eta]$ is the intrinsic viscosity in deciliters per gram, and M is the average molecular weight.

When polyethylenes of molecular weights such as 100,000 and below are chlorinated for use in our invention, solution chlorination methods can be used to advantage to obtain the desired amorphous products.

The glass transition temperatures above cited can be determined by a standard test for stiffness (ASTM test D–1043–61T), as the temperature below which the stiffness sharply increases so that the sample becomes brittle. A typical stiffness modulus at the glass transition temperature for the subject chlorinated polyethylenes is $1.45 \times 10^4$ p.s.i. (i.e. $10^9$ dynes/cm.$^2$).

One preferred group of randomly chlorinated polyethylenes of chlorine content in the range 20–80 percent by weight used in our invention, will have relatively high intrinsic viscosities from about 1.5 to about 5 deciliters per gram, indicating high molecular weight. Other useful and preferred chlorinated polyethylenes, not necessarily amorphous, will have intrinsic viscosities from about 0.1 to about 1.5 deciliters per gram, indicating lower molecular weight of the polymer. These intrinsic viscosities are determined upon a 0.1 gram per 100 ml. solution in o-dichlorobenzene at 100° C.

The following examples describe completely specific embodiments of our invention and illustrate the best mode contemplated by us of carrying out our invention, but are not to be interpreted as limiting the invention to all details of the examples.

The samples tested consisted of unstabilized controls are compositions containing stabilizer in an amount equal to 4% by weight of the weight of the chlorinated polyethylene.

In all tests the chlorinated polyethylene sample was ground to about —40 mesh powder. The stabilizer was dissolved in a volatile solvent, such as methanol. This solution was added to the powdered polymer and the mixture was stirred under $N_2$ at ambient temperatures, until completely dried.

About 2–3 grams of each prepared sample were heated in open test tubes in a block heater at 200° C. for 60 minutes, except where specified otherwise. This heat treatment of the sample resulted in the thermal breakdown of the polymer into a certain percentage of a crosslinked product, or gel; as well as resulting in a discoloration of the polymer, manifested by darkening. The quantitative value of the discoloration was measured using a reflectance meter with a green filter, by comparing the reflectance of the sample to that of a standard white magnesium oxide sample. The reflectance reading obtained on the discolored sample was then expressed as "percent whiteness," the reflectance of the standard being taken as 100% whiteness.

The amount of crosslinked product or gel formed as a result of the heat treatment was determined in accordance with the following procedure.

About 0.2 to 0.3 gram of the heat treated polymer was weighed into a tared stainless steel basket made of 250 mesh screen. This basket was placed into a Soxhlet extractor containing approximately 125 ml. monochlorobenzene, and refluxed for six hours. The noncrosslinked product was extracted, permitting gravimetric determination of the crosslinked gel. During the extraction the system was kept under slow $N_2$ stream to prevent oxidation.

Of the useful stabilizers according to the invention, the diglycidyl, diallyl, and dibenzyl ethers, and the naphthyl derivative are all novel compounds and methods for their preparation are given in the examples. Parts and percentages are all by weight.

EXAMPLE 1

Five parts (0.10 mol) α,α'-bis(4-hydroxyphenyl)-2,3,5,6-tetrachloro-p-xylene, 0.1 part water, 0.85 part sodium hydroxide and 22.6 parts (0.244 mol) epichlorohydrin were heated at 90° C. for 2 hours. The opaque mixture was diluted with 40 parts toluene and filtered. The filtrate was evaporated to dryness, the residue washed with ethyl ether and recrystallized from chloroform, giving 4.18 parts of α,α'-bis(3,5-dimethyl-4-glycidyloxyphenyl)-2,3,5,6-tetrachloro-p-xylene with a melting point of 223–229° C. Further recrystallization gave a product with a melting point of 227–232° C.

*Analysis.*—Calculated for $C_{30}H_{30}Cl_4O_4$: C, 60.42%; H, 5.07%. Found: C, 58.80%; H, 5.12%.

The structure was further confirmed by infrared and nuclear magnetic resonance examinations.

EXAMPLE 2

144 parts (1 mol) alpha naphthol, 90 parts toluene and 50 parts Filtrol No. 4 clay (a clay catalyst available commercially from the Filtrol Corporation) were heated to boiling until all water was removed by azeotropic distillation with the toluene. The slurry was cooled to 50° C. and 57 parts (0.2 mol) of α,α'-2,3,5,6-hexachloro-p-xylene were added. The mixture was heated at 134–138° C. for 27 hours. Hydrogen chloride, which evolved, was trapped in an alkali solution. Analysis of the alkali solution showed that 0.32 mol hydrogen chloride had evolved out of a theoretically possible 0.4 mol.

After cooling to 80° C., the clay was filtered and the filtrate cooled to 5° C., α,α'-bis(4-hydroxynaphthyl)-2,3,5,6-tetrachloro-p-xylene crystals formed on cooling and were recrystallized from ethylene dichloride. The recrystallized compound had a melting point of 283–285° C.

*Analysis.*—Calculated for $C_{28}H_{18}Cl_4O_2$: C, 63.6%; H, 3.4%; Cl, 26.9%. Found: C, 63.42%; H, 3.47%; Cl, 26.26%.

EXAMPLE 3

Seven parts (0.12 mol) of α,α'-bis(3,5-dimethyl-4-hydroxyphenyl)-2,3,5,6-tetrachloro-p-xylene were dissolved with warming in 50 parts ethanolic potassium hydroxide solution. Nine parts (1.18 mols) allyl chloride were added and the mixture refluxed for 45 minutes. The mixture was cooled and filtered. The solid residue was washed with water to dissolve salt and then treated with warm dioxane, filtered and the filtrate α,α'-bis(3,5-dimethyl-4-alloxyphenyl)-2,3,5,6-tetrachloro-p-xylene, was cooled. Crystals of the obtained diallyl ether had a melting point of 201–202° C.

*Analysis.*—Calculated for $C_{30}H_{30}Cl_4O_2$: C, 63.84%; H, 5.36%; Cl, 25.1%. Found: C, 63.40%; H, 5.21%; Cl, 26.0%.

EXAMPLE 4

To a solution of 10 parts of potassium hydroxide in 160 parts of ethanol were added 5 parts of α,α'-bis(3,5-dimethyl-4-hydroxyphenyl)-2,3,5,6-tetrachloro-p-xylene and 22 parts of benzyl chloride. Upon warming, the temperature of the mixture rose in several minutes to 60–70° C. A precipitate of potassium chloride separated and was removed by filtration after cooling to room temperature. The filtrate was evaporated and the dry residue recrystallized twice from dioxane to give 5 parts (72% of theoretical yield) of white product α,α'-bis(3,5-dimethyl-4-benzyloxyphenyl)-2,3,5,6-tetrachloro-p-xylene, melting at 211.5–212° C.

*Analysis.*—Calculated for $C_{38}H_{34}Cl_4O_2$: C, 68.67%; H, 5.12%; Cl, 21.37%. Found: C, 69.43%; H, 4.93%; Cl, 22.3%.

EXAMPLE 5–7

Table I contains comparative tests obtained with and without the stabilizers of the invention on high molecular weight chlorinated polyethylene produced in accordance with Example 6 of British Patent No. 858,674 above cited for the polyethylene, and Example 3 of French Patent No. 1,316,044 above cited for the chlorination, and having a chlorine content of 60.1% and an intrinsic viscosity of 4.2, and a glass transition temperature of about 73° C. The amount of stabilizer present in the stabilized compositions was equal to 4% by weight of the weight of the polymer.

TABLE I

| Test | Stabilizer | Percent Whiteness | Percent Gel |
|---|---|---|---|
| Control A | Unstabilized resin | 12 | 34 |
| Example 5 | α,α'-bis(3,5-dimethyl-4-hydroxyphenyl)-2,3,5,6-tetrachloro-p-xylene. | 23 | 12 |
| Example 6 | α,α'-bis(4-hydroxynaphthyl)-2,3,5,6-tetrachloro-p-xylene. | 10 | 2 |
| Example 7 | α,α'-bis(3,5-dimethyl-4-glycidyloxyphenyl)-2,3,5,6-tetrachloro-p-xylene. | 26 | 0 |

EXAMPLES 8–9

Table II contains comparative tests obtained with and without the stabilizers of the invention on chlorinated polyethylene prepared in accordance with the methods used in preparing the polymer in Examples 5–7, having a chlorine content of 67.3% and an intrinsic viscosity of 0.7 deciliter per gram, heat treated at 230° C. for 30 minutes. The percentage of stabilizer in the stabilizer compositions was the same as in Examples 5–7.

TABLE II

| Test | Stabilizer | Percent Whiteness | Percent Gel |
|---|---|---|---|
| Control B | Unstabilized resin | 4 | 16 |
| Example 8 | α,α'-bis(3,5-dimethyl-4-benzyloxyphenyl)-2,3,5,6-tetrachloro-p-xylene. | 4 | 4 |
| Example 9 | α,α'-bis(3,5-dimethyl-4-alloxyphenyl)-2,3,5,6-tetrachloro-p-xylene. | 5 | 1 |

We claim:
1. α,α' - bis(3,5-dimethyl-4-glycidyloxyphenyl)-2,3,5,6-tetrachloro-p-xylene.

References Cited

UNITED STATES PATENTS 2,986,550   5/1961   Davis et al. _____ 260—348 X

U.S. Cl. X.R.

260—45.8, 45.95, 91.7, 92.8, 613, 619